United States Patent [19]

Huang et al.

[11] Patent Number: 5,493,631
[45] Date of Patent: Feb. 20, 1996

[54] STABILIZED ADAPTIVE NEURAL NETWORK BASED CONTROL SYSTEM

[75] Inventors: Chien Y. Huang, Great Neck; James L. Eilbert, Melville; Stephen J. Engel, E. Northport, all of N.Y.

[73] Assignee: Northrop Grumman Corporation, Los Angeles, Calif.

[21] Appl. No.: 153,096

[22] Filed: Nov. 17, 1993

[51] Int. Cl.$^6$ .................................................. G06F 15/18
[52] U.S. Cl. ............................ 395/22; 395/20; 395/21; 395/23
[58] Field of Search ................... 395/20–25, 27, 395/906; 204/435, 433; 364/157; 382/153–159

[56] References Cited

U.S. PATENT DOCUMENTS

| | | | |
|---|---|---|---|
| 5,113,483 | 5/1992 | Keeler et al. | 395/24 |
| 5,282,261 | 1/1994 | Skeirik | 395/22 |
| 5,287,430 | 2/1994 | Iwamoto et al. | 395/22 |
| 5,303,385 | 4/1994 | Hattori et al. | 395/22 |
| 5,311,421 | 5/1994 | Nomura et al. | 364/157 |
| 5,313,559 | 5/1994 | Ogata et al. | 395/23 |
| 5,367,612 | 11/1994 | Bozich et al. | 395/22 |

OTHER PUBLICATIONS

Paul Munro, "Neural Network," *Yearbook of Science & Technology*, 1992, New York, pp., 284–287.

M. Vidyasagar, "Control System Stability," *Encyclopedia of Science & Technology*, 6th Ed., vol. 4, 1987, New York, pp. 372–376.

Richard C. Dorf, "Control Systems," *Encyclopedia of Science & Technology*, 6th Ed., vol. 4, 1987, New York, pp. 377–384.

Nicholas DeClaris, "Neural Network," *Encyclopedia of Science & Technology*, 6th Ed., vol. 11, 1987, New York, pp. 222–225.

Strefezza et al, "Radial Basis Neural Network Adaptive Controller for Servomotor"; ISIE'93–Budapest, IEEE International Symposium on Industrial Electronics, pp. 747–752, Sep. 1993.

Li et al, "Response of a feedback system with neural network controller in the presence of disturbances"; 1991 IEEE International Joint Conference on Neural Networks, pp. 1560–1565 vol. 2, 18–21 Nov. 1991.

Mazumdar et al, "Adaptive controller for marginally stable nonlinear systems using neural networks"; TENCON '92, pp. 535–539 vol. 1, 11–13 Nov. 1992.

Cui et al, "Direct control and coordination using neural networks"; IEEE Transactions on Systems, Man and Cybernetics, vol. 23, iss. 3, pp. 686–697, May–Jun. 1993.

*Primary Examiner*—David K. Moore
*Assistant Examiner*—Tariq Rafiq Hafiz
*Attorney, Agent, or Firm*—Terry J. Anderson; Karl J. Hoch, Jr.

[57] ABSTRACT

A neural network based control system includes a nominal control system augmented by adaptive control such as a neuro-controller which generates additional compensating control signals based on differences between a model and actual system output. The nominal control system provides basic stability and performance, while the adaptive controller provides performance enhancement. The adaptive control can rely on any neural network that can encode a-priori knowledge and employs a high resolution pattern discrimination capability suitable for real-time changes. To prevent unbounded adaptation, the output of the adaptive controller is constrained by a limiter, thus ensuring safety of the overall system.

3 Claims, 5 Drawing Sheets

STABILIZED ADAPTIVE NEURAL NETWORK BASED CONTROL SYSTEM

BACKGROUND OF THE INVENTION

1. Field of the Invention

This invention relates to a control system, and in particular to a control system with real-time adaptation carried out by adaptive control such as an auxiliary neural network controller.

2. Discussion of Related Art

Conventional control systems are linear and time-invariant. For each input, they are designed to yield a proportional response. However, many systems (hereinafter referred to as plants) controlled by such controllers are themselves non-linear and time-variant and therefore even the best models of plant responses are subject to uncertainty. As a result, in order to achieve a stable response, the range of possible inputs must be limited to those which will keep plant outputs well within a predicted response envelope. In practice, linear time-invariant control systems are designed for specific operating points. Stability margins are built-in so that the responses do not fall outside of an operating envelope due to modeling uncertainties, which often means the plant is not commanded to move as quickly as it can. Thus, in conventional linear control system design, there is an inherent tradeoff between performance and robustness. The more robust or conservative the design, the more limited the performance of the system.

Adaptive control uses feedback to compensate for unpredictability in control system models by providing for on-line parameter identification and necessary changes in the control responses or gains. The payoff is enhanced performance, but it comes at the expense of a higher number of computations in the feedback system and more importantly a lack of guarantee for stability. Conventional adaptive control designs, including those which propose to use neural networks to identify and adapt to changing plant parameters, are subject to unmodeled high-frequency dynamics and unmeasurable output disturbances, which can lead to unbounded adaptation and eventual instability. As a result of concerns over stability, and a lack of measure of an adequate stability, true adaptive control systems have yet to be widely accepted in practice.

Neural network-based control systems are useful because neural networks can represent any arbitrary nonlinear functions and can learn from examples the model of the plant, therefore allowing them to control plants with highly complex dynamics. However, if a neural-network controller can change the feedback characteristics online, then it becomes an adaptive control and therefore may suffer from the same problems as an adaptive control.

Three genetic configurations for a neural network controller can be identified. In the direct neuro-controller shown in FIG. 5(a), the neural network 1000 is the sole control system that directly issues the control signals needed to make the plant 1010 behave like the model 1020 in response to input from a sensor 1030. This configuration takes advantage of the internal complexity of the neural network to produce the compensation. Since the neural network does not initially know what constitutes a good control signal sequence, it requires considerable training. It is also susceptible to deviations from the training data and must be completely retrained if there are substantial changes in the plant. Moreover, there is no guarantee of stability.

In an indirect neuro-controller (FIG. 5b)), the neural network 1001 acts as a pattern classifier whose output updates the gains associated with a control system 1002 to force the plant to follow a model. Because of the explicit structure of the baseline control, both off-line training and on-line adaptation of the neural network is expected to be faster than the direct neuro-controller. However, this neuro-controller is only as powerful as the nominal control design and, therefore, does not take full advantage of the inherent complexity of the neural network. As before, there is still the issue of unbounded adaptation.

The third configuration (FIG. 5(c)) is a type of neuro-control that is particularly interesting to researchers looking at models of biological motor control due to its inclusion of a feedforward control. The function of the feedback controller 10020 is gradually taken over by a feedforward controller 10021 as the neural network learns more about controlling the plant. However, this switch may not be complete when there are too many external disturbances to attenuate with the feedback control, although it may be possible to have the feedforward portion 10020 provide some stability, with the feedback part 10021 providing the corrections for the disturbances.

After reviewing these three basic architectures, the Inventors have found that modifications must be made to each of the proposed structures to arrive at a viable design. These changes aim at fully utilizing the complexity of a neural network for pattern matching without over-taxing its capability, and at the same time providing nominal stability as well as preventing unbounded adaptation. The result is a unique design that offers all the benefits of the neural network adaptive control without compromising the safety of the plant operations.

SUMMARY OF THE INVENTION

The primary objective of the invention is to achieve a compromise between the performance advantages of true adaptive control and the robustness provided by conventional control systems. Real-time adaptivity is provided by adaptive control such as a neural network controller, but a stability margin is built-in by providing a baseline fixed controller with known characteristics and a limiter for the output of the neural network controller to prevent responses from exceeding predetermined stability margins.

The solutions obtained by the invention are applicable not only to aircraft flight control systems, but also to a variety of other control system problems. The invention is particularly applicable to military applications where performance and robustness are both essential to safety. In non-combat situations, robustness is often a priority over performance, and thus the need for compromise is less immediate. However, in military situations the lack of performance can be as detrimental in terms of safety as the lack of system robustness.

In order to optimize performance, the preferred neural network controller requires on-line adaptation, with off-line neural network training. The neural network, as a result, is used to directly produce corrective control actions, thereby taking full advantage of the complexity of the neural network, while a nominal control system operates in conjunction with the limiter to ensure basic stability and to provide a reasonable gain and phase margin to work with. The limiter guarantees that the control signal generated by the neuro-controller does not overwhelm that of the nominal system by directly limiting the control signal, thus providing the desired robustness. The neural network compares both the actual plant and model responses, and generates a control command which is constrained by the limiters to stay within the gain and phase margins provided by the nonfinal control system, taking advantage of the strength of the neural network for feature extraction while utilizing a conventional nonfinal control system for basic stability.

DETAILED DESCRIPTION OF THE PREFERRED EMBODIMENTS

Figure 1:
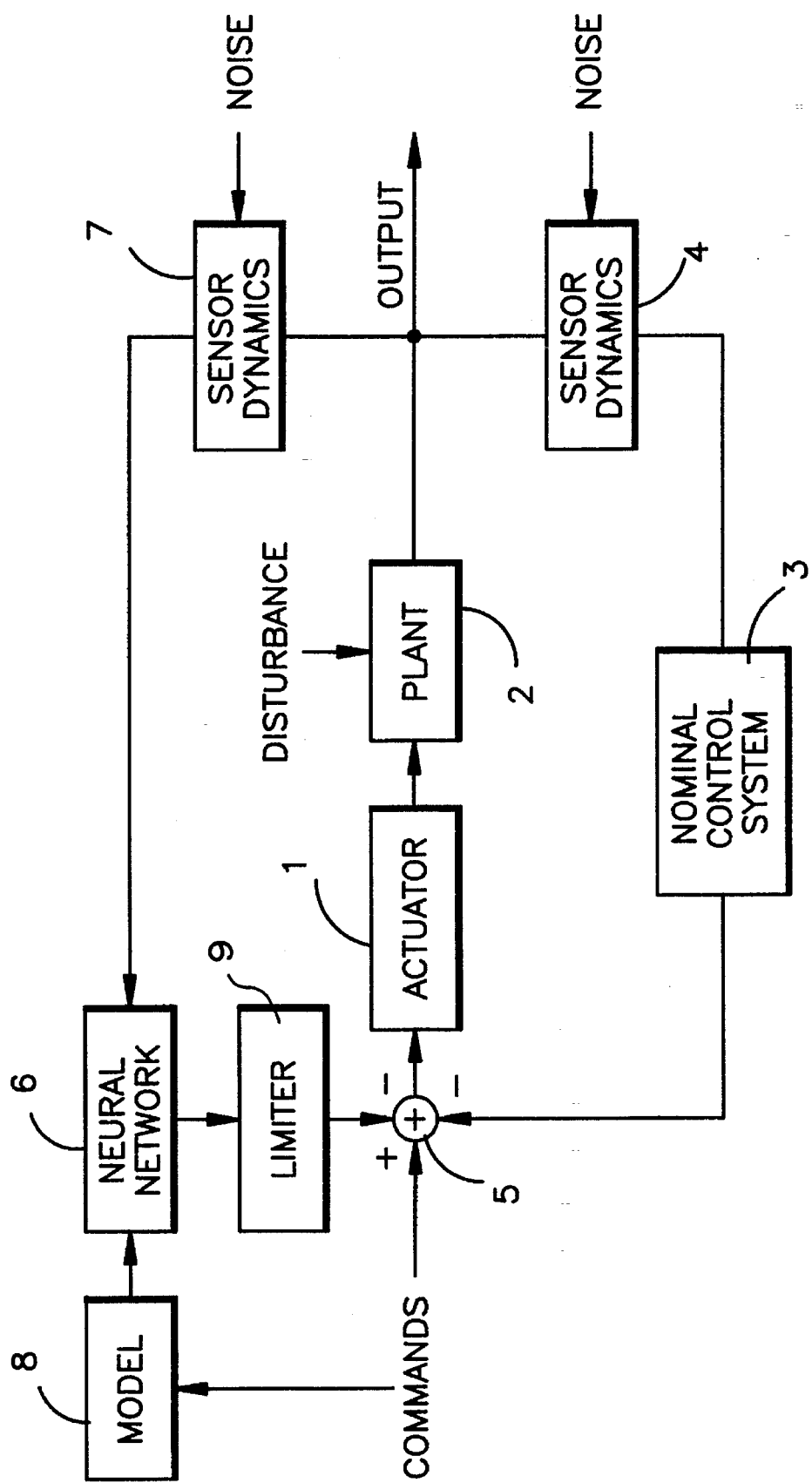
FIG. 1 is a functional block diagram of a preferred system which embodies the principles of the invention.

As shown in the FIG. 1, the preferred control system includes an actuator 1 which controls some aspect of the performance of a plant 2, for example an aircraft, subject to external disturbances, in response to command input from, for example, a joystick or pedal. A nominal control system 3, for example, a conventional control system generates a correction or control signal in response to the results of actuation as sensed by a sensor 4. The control signal generated by control system 3 is subtracted by a subtractor 5 from the input command signal and the combined signal drives the actuator 1 until the control signal equals the input command signal, at which time the plant is assumed to have performed the commanded action, the combined control signal being zero.

An additional adaptive controller in the form of a neural network 6, which evaluates the output of sensor 7 in response to a model 8, also generates a control signal for the actuator. The control signal from the neural network 6 modifies the input command signal, as does the nominal control signal, such that the actuator is controlled depending on the difference between a desired or commanded response and the an assumed actual response. The neural network takes into account learned and actual nonlinear responses of the aircraft to the command which is not compensated for by the nominal control system. Because the neuro-controller control signal is not limited to a set of predetermined outputs linearly related to the sensor and command states, it is able to more accurately respond to the changes in the plant and the nonlinearities than can the nominal control system, thus providing adaptivity. To ensure that the control signal does not exceed the gain and phase margins provided by the nominal control system, however, a limiter 9 is provided to constrain the overall system to those margins. The limiter 9 is preferably a smart limiter as will be described in greater detail below.

Neural network 6 can in principle utilize any of a wide variety of known neural network algorithms capable of learning a non-linear function with accuracy. For example, backpropagation, a commonly used scheme based on least square norm, is applicable. Another example of a suitable algorithm for neural network 6 is the Radial Basis Function (RBF) algorithm. RBF is a neural network algorithm which defines classes of data as a set of spheres that surround a given example. RBF learns by adding new examples to a known class or by reducing the size of the spheres when counter-examples appear.

To fully trace the input/output mappings of a dynamic system with a multilayer neural network paradigm is impossible and, as a result, the neural network predictability is not easily determined for inputs that differ greatly from training examples. Lack of predictability is a major issue in safety. For this reason, the preferred limiter 9 is a smart limiter which can change its bounds in accordance with the confidence level of the neural network result. For example, the RBF algorithm automatically generates a confidence level which can be used for this purpose. Therefore, when the real-time data is found to be outside of training patterns, the role of the neural network is reduced until sufficient learning has taken place. This approach further ensures that the neuro-controller does not cause instabilities.

Figure 2:
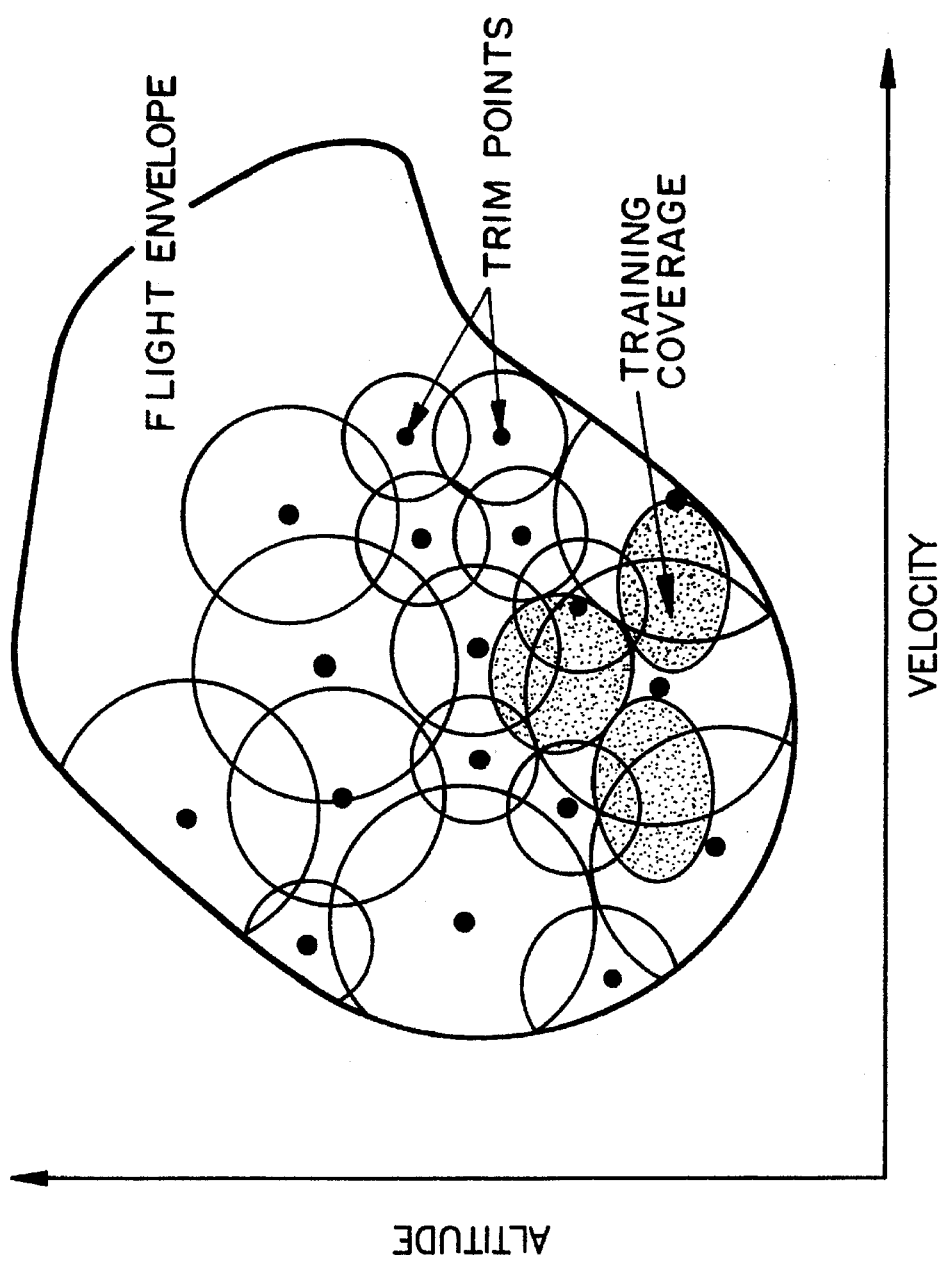
FIG. 2 is a graph illustrating the application of a neural network algorithm to a flight control problem utilizing principles of the invention.

The performance of a neural network is highly dependent on the quality of training examples. The preferred training methodologies involve prior knowledge of the location of a stable operating point to generate exploratory scenarios that attempt to form a representative cover between adjacent points in the operating envelope as illustrated in FIG. 2 for the case of an aircraft. In principle, the neural network output at the stable operating point is zero since the controller is accurate at that point. For this reason, individual networks may be used to cover single interpoint intervals or small interpoint surfaces.

The general strategy for training uses command responses generated by both the model and the plant. For a predefined set of exploratory maneuvers, data is collected. The set of neural network algorithms are trained and their predictions compared with that of the model plus the plant. The training is then reiterated until acceptable performance is achieved. The training includes searching for the best set of input features and making sure that the neural network control signal is within the gain and phase margin of the nominal system.

Example

Figure 3:
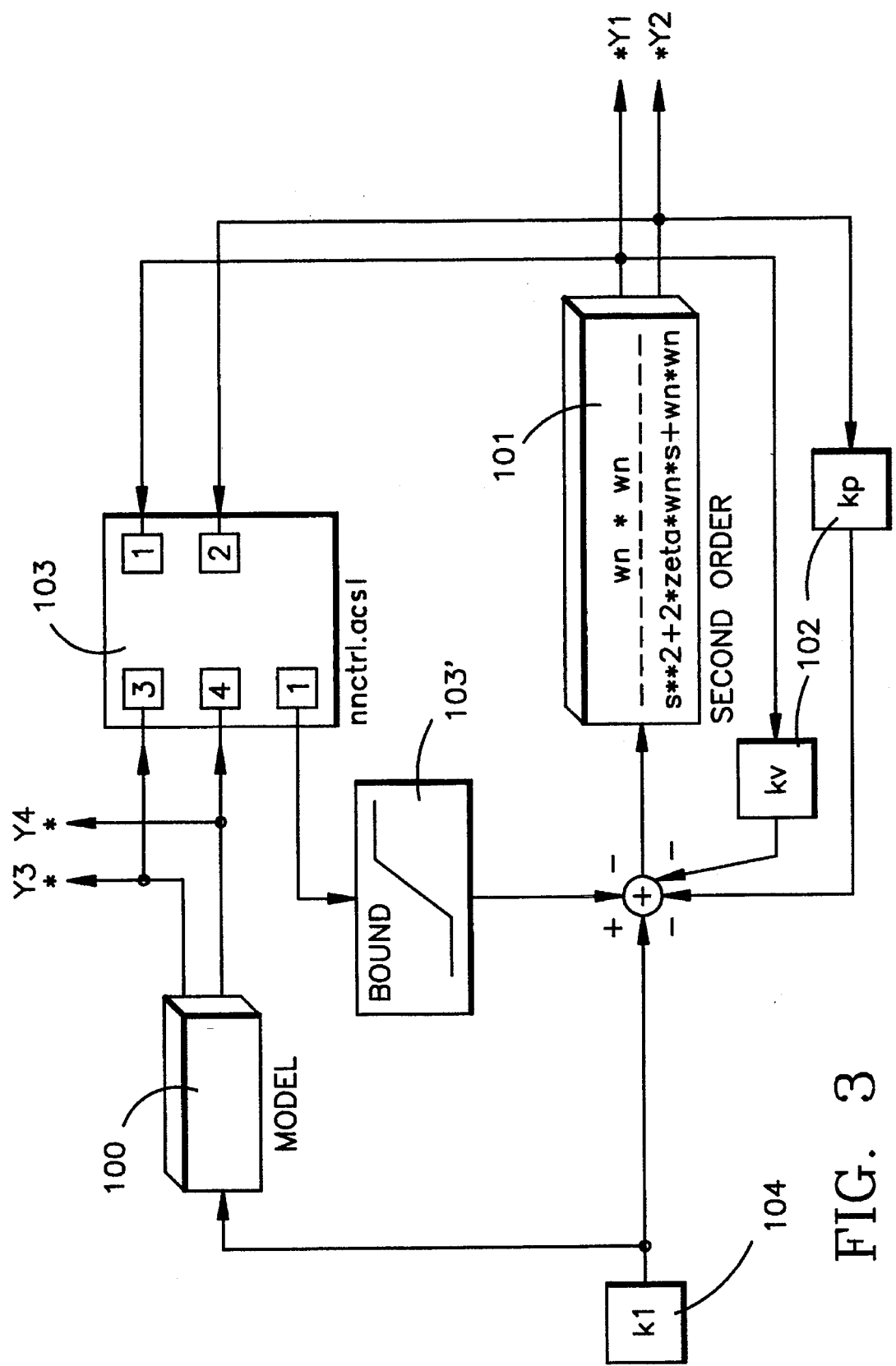
FIG. 3 is a functional block diagram of an exemplary implementation of the system of FIG. 1.

FIG. 3 represents a computer simulation which was performed for the neuro-control architecture shown in FIG. 1. Back propagation was used, but a limiter was not needed in this example due to the small magnitude of the control signals used. The Figure is a display on the software system PROTOBLOCK™ showing an embodiment of the preferred neural network control system in which the plant 100 is a single input single output second-order system with a natural frequency $W_n$ of 0.5 and damping ratio of 0.1. A model 101 of the plant's behavior has a damping ratio of 0.8. A dual channel velocity and position feedback 102 serves as the nominal control system. The gains were chosen such that the closed-loop system is lightly damped (0.3). The neuro-controller 103 uses the L4 backpropagation algorithm with one hidden layer having only two units, and includes velocity and position inputs from the plant 100 and the model 101, and a control signal output 103. The setup generates its own training data and does not have access to the errors in the neural network output, and thus operates essentially in an indirect supervision mode. A uniform random noise between 0 and 1 is used as the command input 104 for the first ten seconds and a steady state command of 1.0 is used for the remaining ten seconds.

Figure 4:
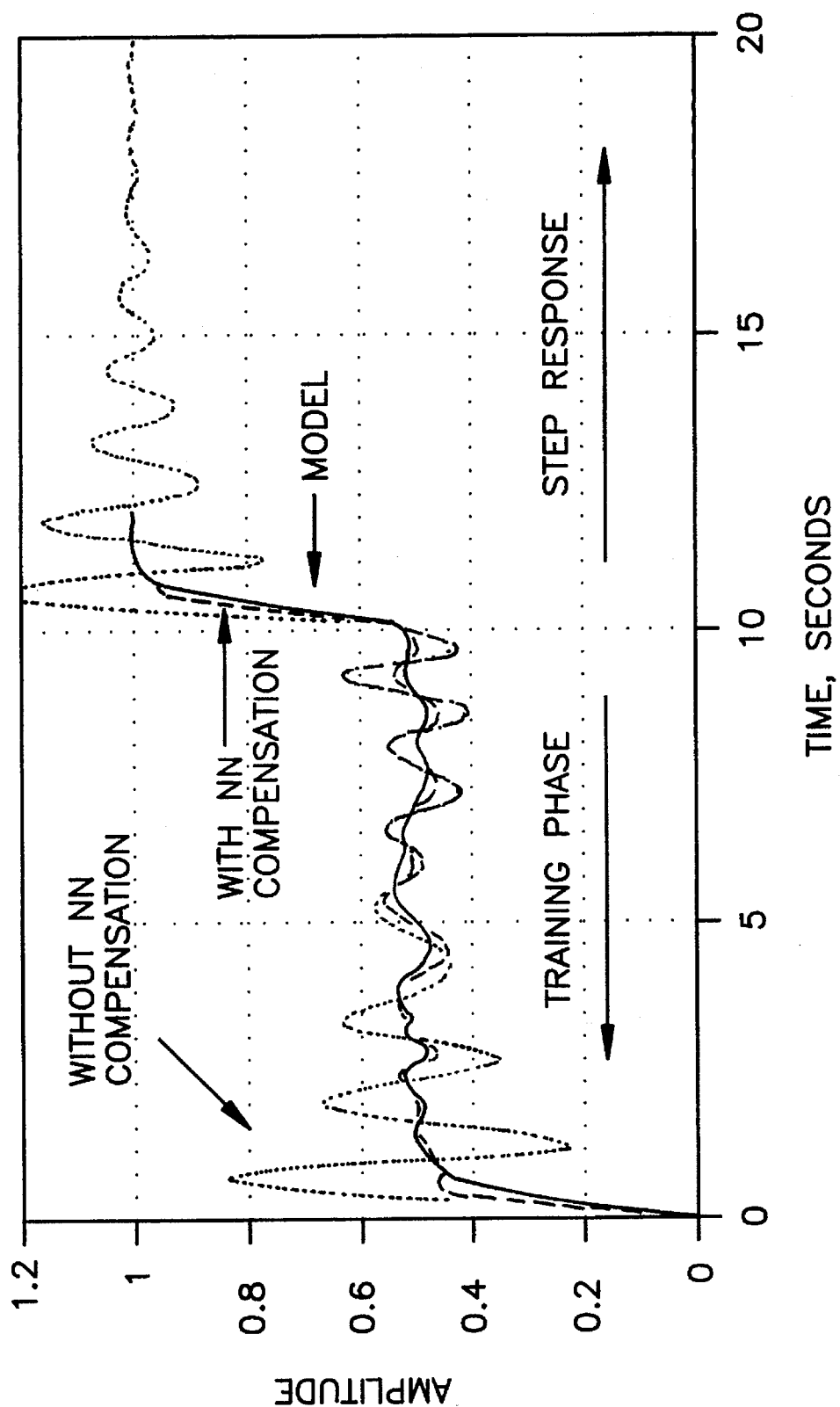
FIG. 4 is a graph illustrating the operation of the implementation of FIG. 3.
Figures 5A, 5B, 5C:
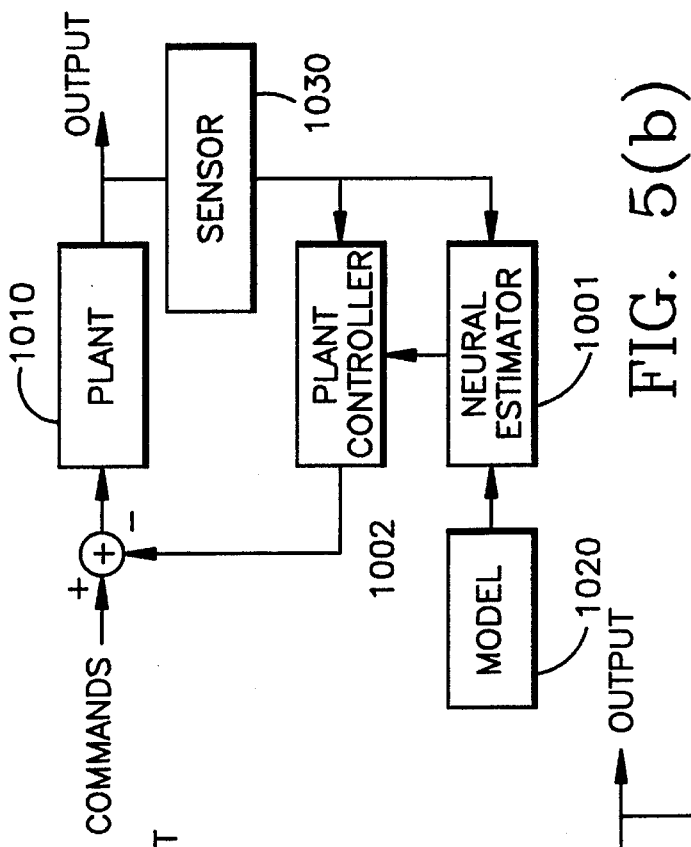
FIGS. 5(a)–5(c) are functional block diagrams illustrating, for exemplary purposes, proposed adaptive control using neural network based control systems other than that of the preferred invention.

As shown in FIG. 4, the neural network control system was able to track the model reasonably well even during the training state. Its performance is far superior to that of the nominal system, which exhibits considerable ringing. A discrete limiter was not used in this example, since the control signals generated by the neural network control system were small.

Having thus outlined the principles of a preferred embodiment of the invention, and the best implementations of those principles presently known, it will be appreciated by those skilled in the art that numerous modifications may be possible, and therefore it is intended that the invention be limited solely by the appended claims.

We claim:

1. A control system, comprising:

means for generating a command control signal in response to a command and supplying the command control signal to an actuator to cause the actuator to initiate an action in a plant in response to the command control signal;

means for sensing results of the action and outputting a first sensor signal and a second sensor signal based thereon;

a nominal control system, including:
means responsive to the first sensor signal for generating a first control signal in response to sensing of the results of the action; and an auxiliary adaptive control system, including:
means for comparing the action as indicated by the second sensor signal with a model of the action based on said command and generating a second control signal in response to the comparison;
means for combining said first and second control signals with said command control signal to modify said command control signal supplied to the actuator, wherein said auxiliary adaptive control system includes a neuro-controller which generates a corrective control signal responsive to said second sensor signal and to a learned condition, and further comprising a limiter which limits the second control signal within a gain margin and a phase margin of the nominal control system in order to generate said second control signal, and means for changing an amount by which the limiter limits the second control signal in accordance with a confidence level generated by the neuro-controller.

2. A system as claimed in claim 1, wherein said plant is an aircraft.

3. A control system, comprising:

means for generating a command control signal in response to a command and supplying the command control signal to an aerator to cause the actuator to initiate an action in a plant in response to the command control signal;

means for sensing results of the action and outputting a first sensor signal and a second sensor signal based thereon;

a nominal control system including:
means responsive to the first sensor signal for generating a first control signal in response to sensing of the results of the action; and an auxiliary adaptive control system, including:
means for comparing the action as indicated by the second sensor signal with a model of the action based on said command and generating a second control signal in response to the comparison;
means for combining said first and second control signals with said command control signal to modify said command control signal supplied to the actuator.

wherein said auxiliary adaptive control system includes a neuro-controller, and wherein said neuro-controller is arranged to compare the action as indicated by the second sensor signal, generate a second control signal in response to the comparison while on-line in said plant, and be trained off-line.

* * * * *